United States Patent [19]

Tarnay et al.

[11] Patent Number: 4,934,402
[45] Date of Patent: Jun. 19, 1990

[54] FLUID DIVERTER

[75] Inventors: Matthew G. Tarnay, Pasadena; Samuel Rivera, Saugus; Patsy B. Palmer, Newhall, all of Calif.

[73] Assignee: Price Pfister, Inc., Pacoima, Calif.

[21] Appl. No.: 284,191

[22] Filed: Dec. 14, 1988

[51] Int. Cl.⁵ .............................................. F16K 11/00
[52] U.S. Cl. ...................................................... 137/119
[58] Field of Search ................................ 137/119, 610

[56] References Cited

U.S. PATENT DOCUMENTS

| | | | |
|---|---|---|---|
| 2,949,933 | 8/1960 | Moen | 137/119 X |
| 3,895,643 | 7/1975 | Ward | 137/119 |
| 4,008,732 | 2/1977 | Fichter | 137/119 |

*Primary Examiner*—Alan Cohan
*Attorney, Agent, or Firm*—Barry E. Deutsch; J. Bruce Hoofnagle

[57] ABSTRACT

A diverter valve for a faucet directs water to either the faucet spout or a spray nozzle. The faucet assembly of the present invention includes a shuttle chamber from which water may access either of two outlet paths. A poppet valve selectively enables water flow from the shuttle chamber to the outlet path leading to the faucet spout whenever the water pressure in the outlet path leading to the spray nozzle is greater than or equal to the pressure in the shuttle chamber. When the spray nozzle is actuated, pressure in the outlet path leading to the nozzle is relieved and the poppet valve closes off the outlet path leading to the faucet spout. A bypass channel is provided between the shuttle chamber and the outlet path leading to the spray nozzle, thereby allowing water to flow through the nozzle while it is actuated. A precision sized orifice in the bypass channel maintains the pressure differential acting on the poppet valve so that flow to the faucet spout remains cut off while the spray nozzle is actuated.

10 Claims, 3 Drawing Sheets

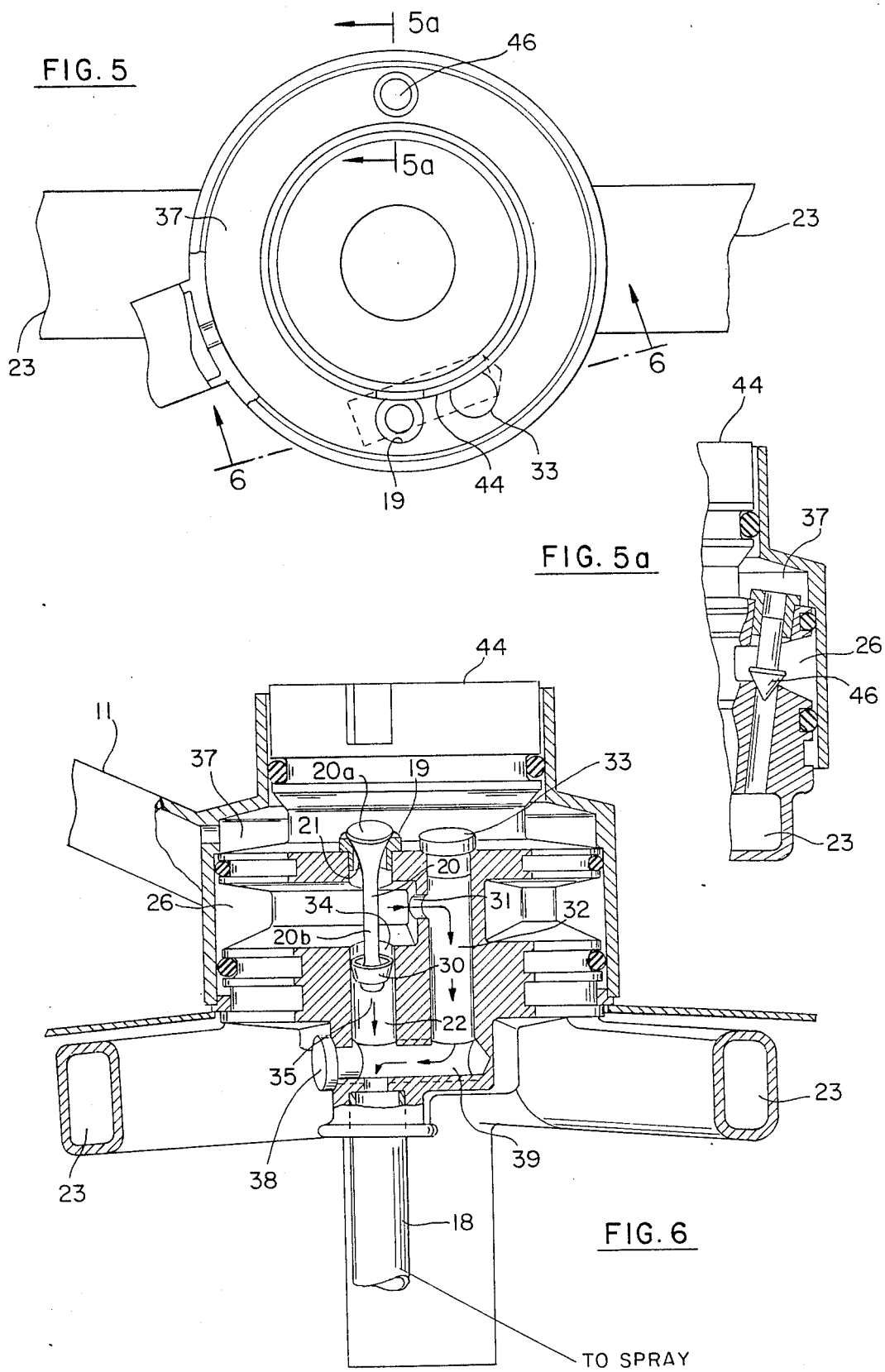

FLUID DIVERTER

BACKGROUND OF THE PRESENT INVENTION

1. Field of the Present Invention

This invention relates to the field of fluid diverter mechanisms for faucets.

2. Background Art

In sink/faucet systems, there is often provided a spray nozzle in addition to the primary outlet, i.e. the faucet spout. The spray nozzle (secondary outlet) is typically coupled to a flexible hose for use in rinsing or spraying water in areas otherwise unreachable by the discharge of the faucet spout.

In such sink/faucet systems, it is desired that when the spray nozzle is activated, the flow from the faucet spout is terminated automatically. Further, when the spray nozzle is deactivated, the flow should automatically be redirected to the faucet spout. In the prior art, this switching from primary to secondary outlet and from secondary to primary outlet is accomplished through the use of a fluid diverter valve.

Generally, a faucet is coupled to a fluid source, such as a residential or commercial water supply system. When the main control of the faucet is opened, water flows to a mixing or "shuttle" chamber from which the water can pass to the primary or secondary delivery outlets. In the prior art, two flow paths branch off from the shuttle chamber in a "T" configuration. A poppet valve is situated between the two flow paths to control the flow of water out of the shuttle chamber.

Generally, the poppet valve is situated with a valve seat in the primary flow path so that when the main control of the faucet is of, the poppet is seated and the primary flow path is closed. The stem of the poppet extends into the secondary flow path and includes a flexible sealing means such as a piston which is slideable within the secondary flow path. When the faucet control is opened, the increased water pressure in the shuttle chamber forces the poppet away from its seat, thereby allowing water to flow through the primary flow path to the faucet spout.

When the spray nozzle is actuated, water pressure in the secondary flow path is released. The resulting pressure differential between the shuttle chamber and the secondary flow path acts upon the piston to cause the poppet valve to close. This seals the primary flow path, thereby diverting the flow of water from the faucet spout to the spray nozzle. A clearance is provided betwen the piston and the secondary flow path to allow water to continue to flow to the spray nozzle as long as it is actuated.

A disadvantage of this prior art diverter mechanism is that the piston disposed within the secondary flow path must have a large enough area to control the poppet when the spray nozzle is actuated, yet have a sufficient clearance within the secondary flow path to allow an adequate flow of water to the spray nozzle. In typical residential and commercial water supply systems, particles in the water supply frequently get caught between the inner wall of the secondary flow path and the piston. If these particles wedge in tightly, they prevent motion of the poppet, either preventing flow to the faucet spout or preventing automatic shut-of of the faucet spout when the spray nozzle is activated. This requires frequent maintenance and/or replacement of the poppet valve assembly or the entire faucet.

Certain prior art diverters of the "cartridge" type include a bypass path so that water may flow to the spray nozzle without flowing past the piston of the diverter assembly. One such apparatus is disclosed in U.S. Pat. No. 2,587,961 issued to Bletcher et al. Such prior art devices require bypass paths having small cross-sectional areas which are also subject to fouling by particulate matter.

Therefore, it is an object of the present invention to provide a fluid diverter in which fouling of the poppet valve by particulate matter is prevented.

It is yet another object of the present invention to provide a fluid diverter in which the secondary flow path to the spray nozzle bypasses the piston.

It is yet another object of the present invention to provide a diverter valve which maintains a proper hydraulic balance between the shuttle chamber and the primary and secondary outlets.

SUMMARY OF THE PRESENT INVENTION

The present invention is directed to a diverter valve for directing fluid to one of two outlets, a primary outlet and a secondary outlet. The faucet assembly of the present invention includes a shuttle chamber from which water may access either of two outlet paths. The present invention provides a positive seal for the piston of the poppet valve anda bypass channel to the secondary outlet. Since the bypass channel provides a flow path to the secondary outlet, there is no flow past the piston of the poppet valve, thereby eliminating the possibility of particulates jamming the poppet valve.

The bypass channel includes a precision sized orifice designed to maintainthe hydraulic pressure balance necessary for proper operation of the diverter mechanism. The bypass channel downstream of the orifice is larger than the diameter of the orifice so that any particulate matter that passes through the orifice will not be trapped within the bypass channel or secondary flow path.

BRIEF DESCRIPTION OF THE DRAWINGS

FIG. 5a is a partial cutaway view of the preferred embodiment of the present invention taken along lines 5a—5a of FIG. 5.

FIG. 5 is a top view of the diverter faucet assembly of the present invention.

FIG. 6 is a cutaway view of the diverter assembly of the preferred embodiment of the present invention taken along line 6—6 of FIG. 5.

DETAILED DESCRIPTION OF THE PRESENT INVENTION

The present invention provides a mechanism to divert water from a primary outlet of a faucet to a secondary outlet, such as a spray nozzle. A bypass channel is utilized to divert water to the secondary outlet so that no flow is required around the diverter piston as in prior art diverters.

In operation, water is provided to a mixing or "shuttle" chamber of a faucet housing. A primary flow path and a secondary flow path branch off of the shuttle chamber in a "T" configuration. The primary flow path and secondary flow path lead to the faucet spout and spray nozzle respectively.

A poppet valve assembly is disposed at the junction of the shuttle chamber and the primary and secondary flow paths. A first end of the poppet assembly extends into the primary flow path and comprises a tapered seating member having a diameter larger than the diameter of the valve seat. A second end of the poppet assembly comprises a piston which extends into the secondary flow path. When the faucet control is opened, the pressure difference between the shuttle chamber (full line pressure) and the primary outlet (exposed to atmosphere) causes the first end of the poppet to unseat, thereby allowing water to flow from the shuttle chamber to the primary outlet.

When the spray nozzle is activated, the water pressure within the secondary flow path is relieved. The resulting pressure differential across the piston pulls the piston down so that the poppet valve seals the primary flow path, thereby shutting off flow to the faucet spout. The piston of the preferred embodiment of the present invention is a resilient cup-shaped piston having its open end facing the shuttle chamber so that fluid flow is prevented around the piston in the downstream direction. This prevents the possibility of particulate matter being trapped between the piston and the inner wall of the secondary flow path. A bypass channel provides a flow path from the shuttle chamber to the secondary flow path downstream of the piston.

PRIOR ART

Figure 1:
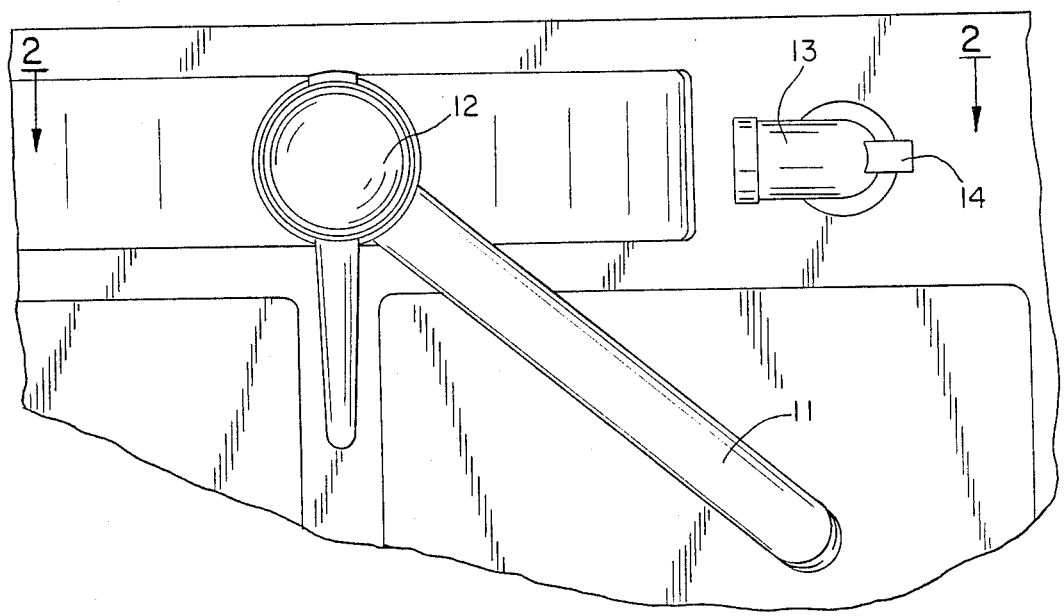
FIG. 1 is a top view of a typical sink/faucet assembly in which the present invention may be employed.

The present invention can be understood best by referring to a typical water faucet assembly. Such an assembly, which has equal application to the prior art and the present invention, is illustrated generally as 8 in FIGS. 1 and 2. Referring first to FIG. 1, a primary outlet such as faucet spout 11 is disposed over a sink 10. A faucet handle 12 controls activation of faucet 8. A spray nozzle 13 is provided as part of faucet 8 and is activated by lever 14.

Figure 2:
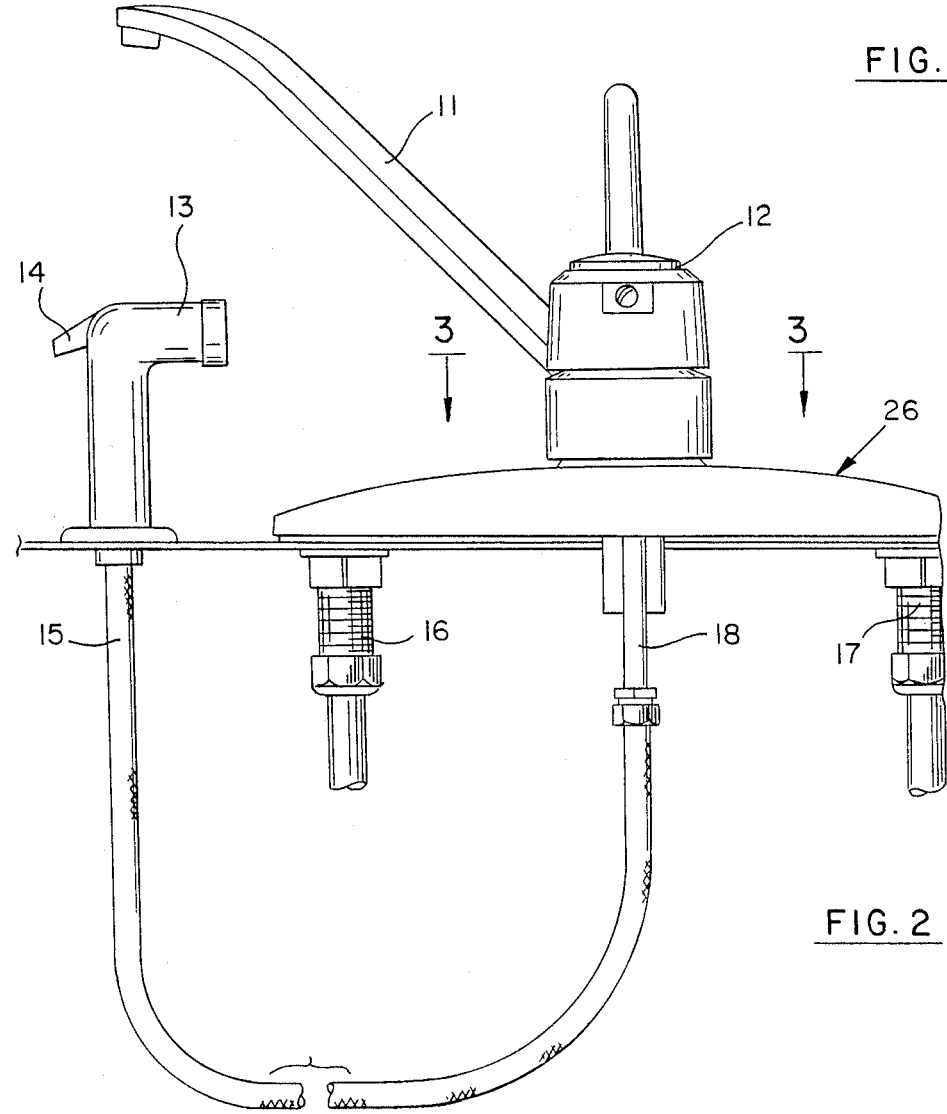
FIG. 2 is a rear view of the faucet assembly of FIG. 1.

Referring to FIG. 2, a rear view of faucet 8 is illustrated. Hot and cold water supply lines 16 and 17 provide water to faucet assembly 8. A water connection 18 leads from the faucet assembly to a flexible hose 15 which is coupled at its terminal end to spray nozzle 13. A thumb activated control lever 14, normally biased to the deactivated position, is provided to activate the spray nozzle 13. As noted previously, it is desired that when the spray nozzle 13 is activated, flow is shut off to the faucet spout 11. Similarly, when the spray nozzle 13 is deactivated, it is desired that flow automatically resume to the faucet spout 11.

Figure 3:
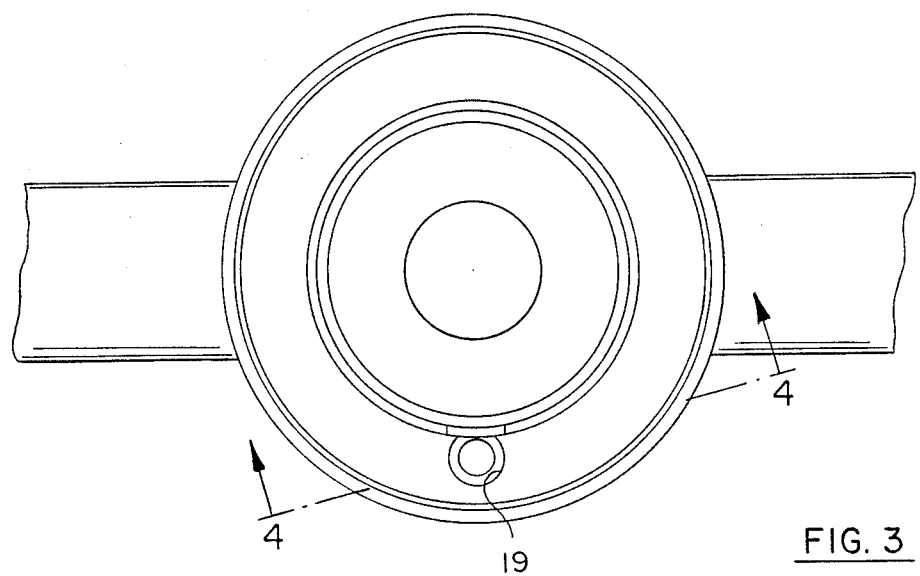
FIG. 3 is a top view of the diverter assembly of FIG. 2 taken along line 3—3 showing a prior art diverter assembly.
Figure 4:
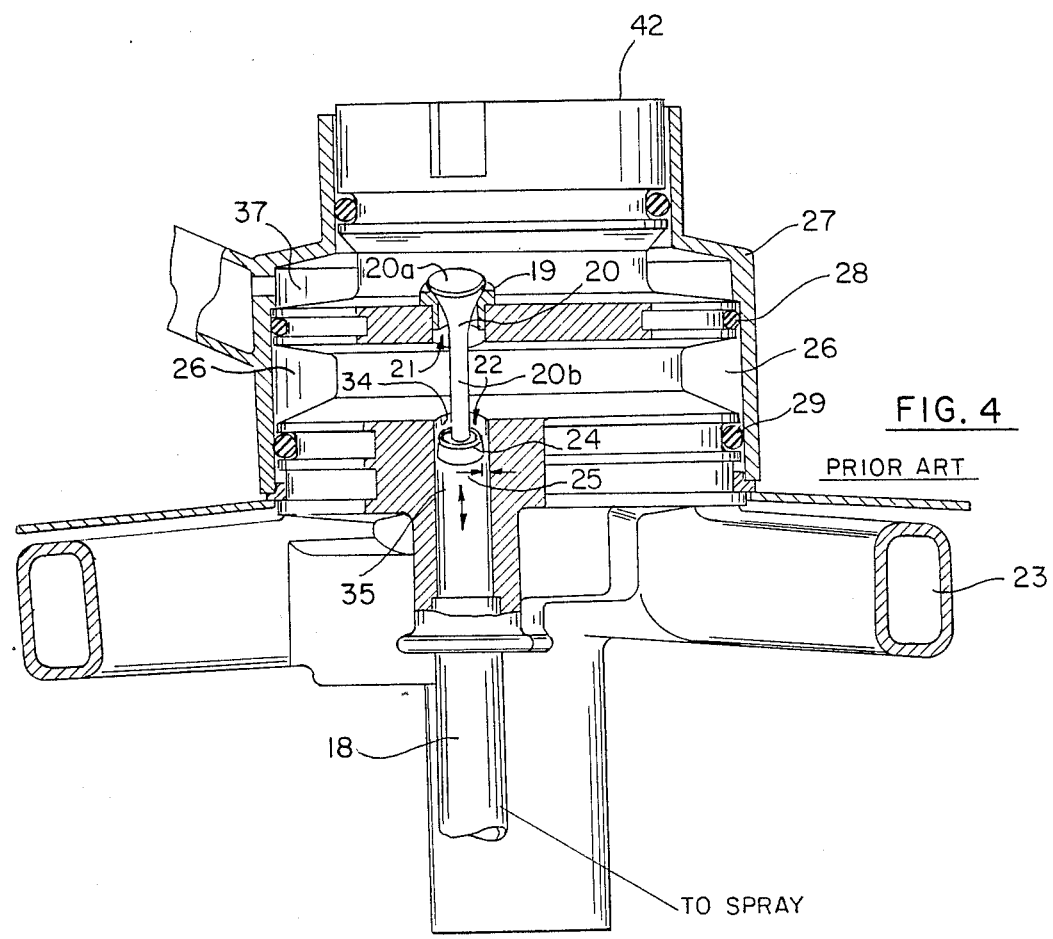
FIG. 4 is a cutaway view of a prior art diverter faucet assembly taken along line 4—4.

A prior art diverter valve assembly is illustrated in FIGS. 3 and 4. Water from a water supply source is provided to the faucet housing through supply path 23. The water enters a shuttle chamber 26 formed between the faucet body 42 and the outer housing 27. O rings 28 and 29 provide a seal between the outer housing 27 and the shuttle chamber 26. Primary flow path 21 and secondary flow path 22 each branch off the shuttle chamber 26 in a "T" configuration.

A poppet valve 20 is disposed in the faucet assembly extending through primary flow path 21 and into secondary flow path 22. The poppet valve 20 has a tapered end 20a which seals against valve seat 19. Tapered end 20a of poppet 20 and valve seat 19 thus provide a fluid seal to close off the primary flow path 21 from faucet outlet path 37.

The stem 20b of the poppet valve 20 extends through shuttle chamber 26 and into the secondary flow path 22. A piston 24 is attached to stem 20b. In prior art diverters, there is a substantial gap 25 between the inner wall of the secondary flow path 22 and the piston 24. This gap 25 provides a flow path for water from the shuttle chamber 26 to the secondary flow path 22. Secondary flow path 22 leads to water connection 18 which then leads to the spray nozzle 13.

In operation, when faucet handle 12 is opened, water under line pressure is introduced into shuttle chamber 26. A pressure differential is thereby created between the shuttle chamber 26 and the faucet outlet path 37. The greater pressure in the shuttle chamber 26 forces the poppet 20 to rise, unseating end 20a from valve seat 19 and creating a fluid connection through the primary flow path 21 to the faucet outlet. In this situation, the fluid pressure in the area 35 below piston 24 is equal to the fluid pressure in the area 34 above piston 24.

When control lever 14 is depressed to actuate the spray nozzle 13, a pressure differential is created between the area 35 below piston 24 and the area 34 above piston 24. This pressure differential, together with the larger surface area of piston 24 relative to tapered end 20a, forces poppet 20 down and causes end 20a to seat in valve seat 19, thereby sealing off the primary flow path 21. Water from the shuttle chamber 26 flows through the gap 25 to the secondary flow path 22. From there, the water flows through the connector 18 to the nozzle 13.

PREFERRED EMBODIMENT OF THE PRESENT INVENTION

The preferred embodiment of the present invention is illustrated in FIGS. 5 and 6. The present invention provides a solution to the particulate trapping problem of the prior art. The present invention provides a bypass flow path 32 from the shuttle chamber 26 to the water connector 18 which leads to the spray nozzle 13.

Poppet 20 in the present invention may be identical to that of the prior art, however, piston 30 is different from piston 24 in several respects. Piston 30 is generally cup shaped having an open end facing shuttle chamber 26. In this regard, piston 30 has the opposite orientation to that of piston 24. Piston 30 is made of a resilient material and is sized to fit within secondary flow path 22 with only a slight clearance. As is more fully explained below, it is desirable that there be no flow of water past piston 30 within flow path 22, so provision of a substantial clearance such as clearance 25 shown in FIG. 4 is neither required nor desired in the embodiment illustrated in FIG. 6. The only requirement is that piston 30 be able to move freely within flow path 22.

With respect to the primary flow path, the present invention operates in the same manner as previously described for the prior art diverter assembly. The attendant differences and advantages of the present invention become apparent in regard to the operation of the secondary flow path.

When the spray nozzle 13 is actuated, water pressure in connector 18 is relieved. Consequently, the pressure in areas 35 and 39 is lower than the pressure in shuttle chamber 26. Water flows through the orifice 31 to the bypass path 32 to the connector 18 and then to the spray nozzle. The water pressure in area 34 above piston 30 is greater than the water pressure in area 35 below piston 30. This pressure differential acting on the surface area of piston 30 (larger than tapered end 20a) forces poppet 20 down so that end 20a seals against valve seat 19, thereby cutting off flow to chamber 37 and spout 11. Water pressure expands piston 30 against the inner wall of the secondary flow path 22 to create a fluid seal. This seal prevents the flow of water past piston 30 during activation of spray nozzle 13. By preventing flow of water past piston 30 when the secondary outlet is open, the present invention prevents the collection of particulate matter and potential trapping of particulate matter between the inner wall of the secondary flow path 22 and the piston 30.

The present invention may be implemented in a prior art type of faucet assembly by drilling a bypass path 32 in faucet body 44 substantially parallel to the primary and secondary flow paths 21 and 22. A plug 33 is then used to seal off the bypass path 32 at the upper end thereof (FIG. 5). The bypass path 32 may be connected to the nozzle connector 18 by drilling substantially perpendicularly to the secondary flow path 22 until fluid connection is made with the bypass path 32 through flow path 39. A plug 38 is then employed to seal and define the bypass path 32.

In the preferred embodiment, a check valve 46 is provided between shuttle chamber 26 and water supply path 23. In the event that there is a sudden drop in the water supply pressure, check valve 46 serves to prevent contaminated water from being siphoned from spray nozzle 13 back through shuttle chamber 26 and into the water supply. It should be noted that piston 24 in the prior art embodiment performs a similar function since a pressure in area 35 higher than that in area 34 will cause piston 24 to expand within flow path 22 thereby precluding any back flow through shuttle chamber 26 and into the water supply 23. Piston 30 of the preferred embodiment cannot perform this function since bypass channel 32 will always provide fluid communication between connector 18 and shuttle chamber 26.

In the embodiment shown, the faucet assembly is substantially cylindrical with areas of different diameters defining different chambers such as shuttle chamber 26. By forming orifice 31 substantially tangential to the cylinder defined by the shuttle chamber 26, the orifice 31 becomes self-flushing so that if any particulate matter becomes lodged near orifice 31, it will be flushed out during normal operation of the faucet assembly.

In the preferred embodiment of the present invention, the orifice 31 has the smallest cross-sectional area in the bypass channel. In this manner, it is assured that any particles smaller than the bypass orifice which enter the bypass channel will not obstruct the channel but, rather pass completely through it to the spray head.

In the preferred embodiment of the present invention, the bypass channel is formed integrally with the faucet body 44. However, the bypass channel could be made external to the faucet casting. In addition, the diverter valve of the present invention has been described in terms of water flow through a faucet. The present invention has equal application to any type of fluid flow where a diverter valve is utilized.

The foregoing is considered as illustrative only of the principles of the invention. Further, since numerous modifications and changes will readily occur to those skilled in the art, it is not desired to limit the invention to the exact construction and operation shown and described, and, accordingly, suitable modifications and equivalents may be resorted to which also fall within the scope of the invention.

We claim:

1. An apparatus for diverting fluid from a fluid source to one of a primary outlet and a secondary outlet comprising:
   a first chamber coupled to said fluid source;
   a primary flow path having first and second ends, said first end in fluid communication with said first chamber, and said second end in fluid communication with said primary outlet;
   a secondary flow path having third and fourth ends, said third end in fluid communication with said first chamber and said fourth end in fluid communicaion with said secondary outlet;
   an unattached valve means having first and second ends slidably disposed in said primary and secondary flow paths, respectively, said first end of said valve means selectively engaging said second end of said primary flow path to provide a fluid seal between said first chamber and said primary flow path, said second end of said valve means having piston means coupled thereto slidably engaged within said secondary flow path to provide a fluid seal within said secondary flow path between said first chamber and said secondary outlet;
   a bypass flow path formed independently of said valve means and having fifth and sixth ends, said fifth end in fluid communication with said first chamber and said sixth end in fluid communication with said secondary outlet.

2. The apparatus of claim 1 wherein said fluid source comprises a water supply.

3. The apparatus of claim 1 wherein said primary outlet comprises a faucet spout.

4. The apparatus of claim 1 wherein said secondary outlet comprises a spray nozzle.

5. The apparatus of claim 1 wherein said piston means comprises a resilient cup-shaped piston having an interior volume opening towards said first chamber.

6. The apparatus of claim 1 further comprising check valve means disposed between said first chamber and said fluid source for preventing back flow of fluid.

7. An apparatus for diverting water from a shuttle chamber of a faucet assembly between a faucet outlet and a spray nozzle outlet comprising:
   an unattached poppet valve having a first end and a stem;
   a valve seat disposed between said shuttle chamber and said faucet outlet for sealing engagement with said first end of said poppet valve;
   a cylindrical chamber connecting said shuttle chamber and said spray nozzle outlet;
   a piston coupled to said stem of said poppet valve for sliding engagement within said cylindrical chamber; and
   a bypass channel formed independently of said poppet valve connecting said shuttle chamber and said spray nozzle outlet for providing a water flow path around said piston;
   whereby actuation of said spray nozzle causes said poppet valve to close off fluid communication between said shuttle chamber through said bypass channel to said spray nozzle outlet.

8. The apparatus of claim 7 wherein said bypass channel communicates with said shuttle chamber through an orifice having a diameter such that water flow from said shuttle chamber to said spray nozzle outlet is sufficiently restricted to maintain said poppet valve in a condition to close off fluid communication between said shuttle chamber and said faucet outlet.

9. In a faucet assembly having a generally cylindrical faucet body and outer housing with a shuttle chamber defined therebetween, a primary flow path to a faucet spout, a secondary flow path to a spray nozzle, a cylindrical chamber connecting said shuttle chamber and said secondary flow path, and an unattached poppet valve for selectively closing off fluid communication between said shuttle chamber and said primary flow path, an improved diverter valve comprising:

a resilient cup-shaped piston coupled to a stem of said unattached poppet valve, said piston having an interior volume opening towards said shuttle chamber, said piston in sliding engagement within said cylindrical chamber; and a bypass channel providing fluid communication between said shuttle chamber and said secondary flow path independently of said poppet valve, said bypass channel communicating with said shuttle chamber through an orifice.

10. The apparatus of claim 9 wherein said orifice has an axis generally tangential to said shuttle chamber.

* * * * *